US012618744B2

(12) United States Patent
    Suzuki et al.

(10) Patent No.:    US 12,618,744 B2
(45) Date of Patent:        May 5, 2026

(54) OPTICAL FIBER CHARACTERISTICS MEASUREMENT APPARATUS AND METHOD OF MEASURING OPTICAL FIBER CHARACTERISTICS

(71) Applicant: Yokogawa Electric Corporation, Musashino (JP)

(72) Inventors: Yuta Suzuki, Musashino (JP); Shin-ichirou Tezuka, Musashino (JP); Masayoshi Honma, Musashino (JP)

(73) Assignee: YOKOGAWA ELECTRIC CORPORATION, Tokyo (JP)

( * ) Notice:    Subject to any disclaimer, the term of this patent is extended or adjusted under 35 U.S.C. 154(b) by 71 days.

(21) Appl. No.: 18/670,101

(22) Filed:    May 21, 2024

(65)    Prior Publication Data

US 2024/0393208 A1    Nov. 28, 2024

(30)    Foreign Application Priority Data

May 25, 2023    (JP) ................................. 2023-086474

(51) Int. Cl.
    G01M 11/00    (2006.01)
(52) U.S. Cl.
    CPC ................................. G01M 11/319 (2013.01)
(58) Field of Classification Search
    CPC .. G01M 11/319; G01M 11/31; G01M 11/083; G01M 5/0091; G01M 11/3127; G01M 11/3145; G01M 11/331; G01M 11/33; G01M 11/333; G01M 11/3172; G01H 9/004; G01H 9/002; G01J 3/4412; G01J 9/04; G01J 2005/583; G01J 3/26; G01N 2021/638; G01N 21/1717; G01N 21/21; G01N 21/4795; G01N 21/636; G01B 9/02; G01B 9/02028; G01D 5/35364; G01D 5/268; G01D 5/35306; G01K 11/322; G01K 11/324
See application file for complete search history.

(56)    References Cited

U.S. PATENT DOCUMENTS 5,530,551 A *   6/1996   Cantrall ............... G01B 11/105
                                                             356/394
5,915,279 A *   6/1999   Cantrall ................. G01N 21/31
                                                             250/559.11

(Continued)

FOREIGN PATENT DOCUMENTS

JP          2023-22609 A      2/2023

*Primary Examiner* — Mohamed K Amara
(74) *Attorney, Agent, or Firm* — WHDA, LLP

(57)    ABSTRACT

An optical fiber characteristics measurement apparatus includes a first optical splitter that splits modulated light into pump light and reference light, a second optical splitter that causes the pump light to be incident on a fiber under test from one end and extracts Brillouin scattered light generated within the fiber under test, an adjuster that changes frequency of at least one of the reference light and pump light to a plurality of frequencies, and a calculator that measures characteristics of the fiber under test based on a second harmonic component among frequency components of a signal yielded by homodyne detection of interference light between the Brillouin scattered light and the reference light at each frequency, the second harmonic component having a frequency that is two times the modulation frequency of the modulated light.

8 Claims, 7 Drawing Sheets

(56)  References Cited

U.S. PATENT DOCUMENTS

| | | | | |
|---|---|---|---|---|
| 6,130,766 | A * | 10/2000 | Cao | H04B 10/2569 |
| | | | | 398/1 |
| 6,542,228 | B1 * | 4/2003 | Hartog | G01M 11/3127 |
| | | | | 356/73.1 |
| 9,777,053 | B2 * | 10/2017 | Yun | A61B 3/117 |
| 10,162,245 | B2 * | 12/2018 | Ji | G02F 1/125 |
| 2012/0281201 | A1 * | 11/2012 | Brown | G01B 11/18 |
| | | | | 374/161 |
| 2019/0101419 | A1 * | 4/2019 | Rowen | H01S 3/302 |
| 2022/0050012 | A1 * | 2/2022 | Redding | G01M 11/3109 |
| 2022/0173808 | A1 * | 6/2022 | Yaman | G01M 11/331 |
| 2022/0252435 | A1 * | 8/2022 | Calbris | G01D 5/353 |
| 2022/0412821 | A1 * | 12/2022 | Jaaskelainen | G01M 5/0091 |
| 2024/0133753 | A1 * | 4/2024 | Suh | E21B 47/07 |
| 2025/0052641 | A1 * | 2/2025 | Suzuki | G01M 11/335 |

* cited by examiner

OPTICAL FIBER CHARACTERISTICS MEASUREMENT APPARATUS AND METHOD OF MEASURING OPTICAL FIBER CHARACTERISTICS

CROSS-REFERENCE TO RELATED APPLICATION

The present application claims priority to Japanese Patent Application No. 2023-86474 filed on May 25, 2023, the entire contents of which are incorporated herein by reference.

TECHNICAL FIELD

The present disclosure relates to an optical fiber characteristics measurement apparatus and a method of measuring optical fiber characteristics.

BACKGROUND

A method of measuring optical fiber characteristics by calculating the amount of frequency shift in the peak frequency of the spectrum of Brillouin scattered light generated in an optical fiber is known. See, for example, Patent Literature (PTL) 1.

CITATION LIST

Patent Literature

PTL 1: JP 2023-22609 A

SUMMARY

An optical fiber characteristics measurement apparatus according to several embodiments includes a first optical splitter configured to split a modulated light subjected to frequency modulation into a pump light and a reference light, a second optical splitter configured to cause the pump light to be incident on a fiber under test from one end and configured to extract Brillouin scattered light generated within the fiber under test, an adjuster configured to change a frequency of at least one of the reference light and the pump light to a plurality of frequencies, and a calculator configured to measure characteristics of the fiber under test based on a second harmonic component among frequency components of a signal yielded by homodyne detection of interference light between the Brillouin scattered light and the reference light at each frequency, the second harmonic component being a component having a frequency that is two times a modulation frequency of the modulated light.

A method of measuring optical fiber characteristics according to several embodiments includes splitting a modulated light subjected to frequency modulation into a pump light and a reference light, causing the pump light to be incident on a fiber under test from one end, extracting Brillouin scattered light generated within the fiber under test, changing a frequency of at least one of the reference light and the pump light to a plurality of frequencies, and measuring characteristics of the fiber under test based on a second harmonic component among frequency components of a signal yielded by homodyne detection of interference light between the Brillouin scattered light and the reference light at each frequency, the second harmonic component being a component having a frequency that is two times a modulation frequency of the modulated light.

DETAILED DESCRIPTION

Figure 1:
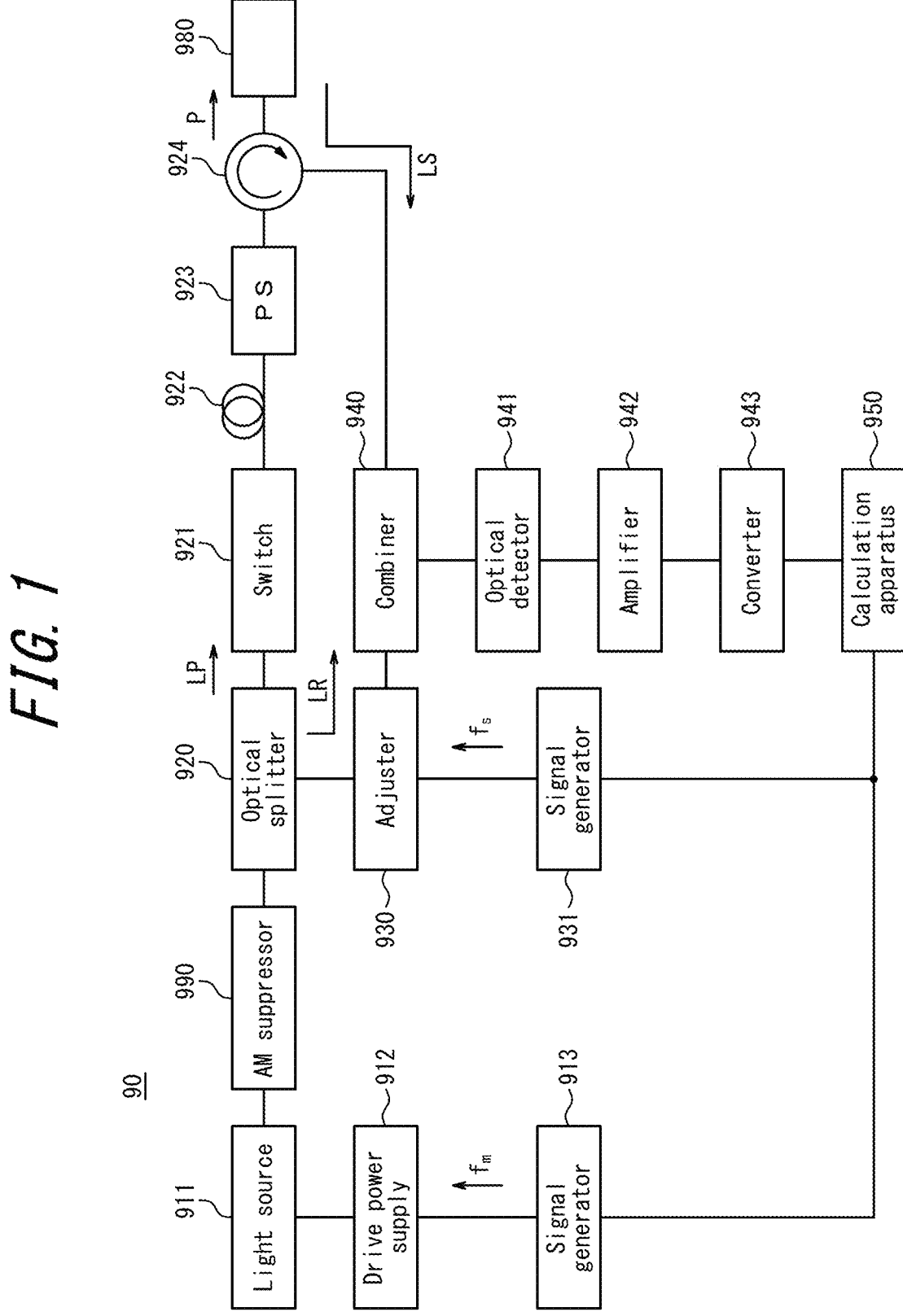
FIG. 1 is a block diagram illustrating a configuration of an optical fiber characteristics measurement apparatus according to a comparative example.

The homodyne BOCDR (Brillouin Optical Correlation Domain Reflectometry) method is sometimes used as a method of measuring the spectrum of Brillouin scattered light, which is used to measure optical fiber characteristics. The homodyne BOCDR method measures the spectrum of Brillouin scattered light by splitting a modulated light subjected to frequency modulation into a pump light and a reference light, causing the pump light to be incident on the fiber under test, and performing homodyne detection of interference light between the Brillouin scattered light generated by the pump light in the fiber under test and the reference light. In the homodyne BOCDR method, the amplitude modulation (AM) component in the modulated light becomes noise. The AM component can be the result of frequency modulation (FM) or may be generated by changes, due to temperature drift, in the splitting ratio of the coupler that splits the modulated light. AM noise reduces the measurement accuracy of the spectrum of Brillouin scattered light. The measurement accuracy of optical fiber characteristics based on the spectrum of Brillouin scattered light also degrades. It would be helpful to provide an optical fiber characteristics measurement apparatus and a method of measuring optical fiber characteristics that can improve the measurement accuracy of optical fiber characteristics based on the measurement results of the spectrum of Brillouin scattered light by the homodyne BOCDR method.

(1) An optical fiber characteristics measurement apparatus according to several embodiments includes a first optical splitter configured to split a modulated light subjected to frequency modulation into a pump light and a reference light, a second optical splitter configured to cause the pump light to be incident on a fiber under test from one end and configured to extract Brillouin scattered light generated within the fiber under test, an adjuster configured to change a frequency of at least one of the reference light and the pump light to a plurality of frequencies, and a calculator configured to measure characteristics of the fiber under test based on a second harmonic component among frequency components of a signal yielded by homodyne detection of interference light between the Brillouin scattered light and the reference light at each frequency, the second harmonic component being a component having a frequency that is two times a modulation frequency of the modulated light. The effect of AM noise is reduced by the spectrum of Brillouin scattered light being measured based on the second harmonic component. As a result, the measurement accuracy of the spectrum of Brillouin scattered light is improved. The measurement accuracy of optical fiber characteristics based on the spectrum of Brillouin scattered light is also improved. Furthermore, the detection of the second harmonic component of the signal yielded by homodyne detection of the interference light eliminates the need for normalization processing to remove noise or bias, which is necessary in the case of detecting a direct current (DC) component. The BGS measurement results are also less susceptible to normalized waveforms that contain noise or bias and vary over a long period of time. As a result, the stability of the BGS measurement over a long period of time is enhanced.

(2) The optical fiber characteristics measurement apparatus recited in (1) may further include a converter configured to output, to the calculator, a signal yielded by sampling, at a predetermined sampling frequency, the signal yielded by homodyne detection of the interference light. The predetermined sampling frequency may be at least two times the frequency that is two times the modulation frequency of the modulated light. As a result of the signal yielded by homodyne detection of the interference light being sampled and subjected to software processing, the circuit is simplified.

(3) In the optical fiber characteristics measurement apparatus recited in (1) or (2), the calculator may be configured to calculate the second harmonic component by mixing the signal yielded by homodyne detection of the interference light and a detection signal having a frequency that is two times the modulation frequency of the modulated light.

(4) The optical fiber characteristics measurement apparatus recited in (3) may further include a light source configured to emit the modulated light and cause the modulated light to travel to the first optical splitter, and a signal generator configured to output a modulation signal having the modulation frequency of the modulated light to the light source and input the detection signal to the calculator. By having the signal generator input the modulation signal to the light source and the detection signal to a calculation apparatus, the frequency difference and relative phase difference between the modulation wave and the detection signal are kept constant. As a result, long-term measurement stability is enhanced.

(5) A method of measuring optical fiber characteristics according to several embodiments includes splitting a modulated light subjected to frequency modulation into a pump light and a reference light, causing the pump light to be incident on a fiber under test from one end, extracting Brillouin scattered light generated within the fiber under test, changing a frequency of at least one of the reference light and the pump light to a plurality of frequencies, and measuring characteristics of the fiber under test based on a second harmonic component among frequency components of a signal yielded by homodyne detection of interference light between the Brillouin scattered light and the reference light at each frequency, the second harmonic component being a component having a frequency that is two times a modulation frequency of the modulated light.

The optical fiber characteristics measurement apparatus and method of measuring optical fiber characteristics according to the present disclosure improve the measurement accuracy of optical fiber characteristics based on the measurement results of the spectrum of Brillouin scattered light by the homodyne BOCDR method.

One possible method of measuring characteristics such as temperature or strain at each position in the length direction of an optical fiber would be a method of detecting scattered light or reflected light generated inside an optical fiber in response to light incident on the optical fiber. The BOCDR method (Brillouin Optical Correlation Domain Reflectometry) is one example of the methods of measuring optical fiber characteristics. The BOCDR method includes causing a pump light split from modulated light subjected to frequency modulation to be incident on an optical fiber and detecting interference light generated by interference between the reference light split from the modulated light and the Brillouin scattered light generated inside the optical fiber. The Brillouin scattered light is backscattered light, generated by Brillouin scattering caused by the pump light incident on the optical fiber, and returns to the end at which the pump light was incident.

The BOCDR method further includes acquiring the spectrum of Brillouin scattered light from a signal yielded by detecting interference light. The spectrum of Brillouin scattered light is also referred to as a Brillouin gain spectrum (BGS). In the BOCDR method according to the present disclosure, the spectrum of Brillouin scattered light is acquired by homodyne detection. Homodyne detection is a technique to detect signals by offsetting the frequency of the reference light and causing interference with the Brillouin scattered light.

The peak frequency of the BGS is determined by the characteristics of the optical fiber from which the Brillouin scattered light is measured. Therefore, the characteristics of the optical fiber are measured by calculating the peak frequency of the BGS. The peak frequency of the BGS is also referred to as the Brillouin Frequency Shift (BFS).

In the BOCDR method, by causing Brillouin scattered light and reference light to interfere, Brillouin scattered light at a specific position in the optical fiber where the correlation peak appears is selectively extracted. The correlation peak is a peak that appears in the interference light as a result of the Brillouin scattered light and the reference light intensifying each other. The specific position where the correlation peak appears is the position in the optical fiber at which the Brillouin scattered light and the reference light intensify each other, causing the correlation peak of the interference light to appear. The specific position at which the correlation peak appears occurs periodically in the optical fiber. Furthermore, the specific position at which the correlation peak appears moves in the length direction of the optical fiber as the modulation frequency of the pump light and reference light changes. Therefore, by sweeping the modulation frequency, the specific position at which the correlation peak appears can be moved. Calculating the BFS at the position at which each correlation peak appears while causing the correlation peak to move allows the BOCDR method to detect changes in characteristics, such as temperature or strain, at each position in the length direction of the optical fiber. As a result, the characteristic distribution such as temperature distribution or strain distribution in the length direction of the optical fiber is measured.

Comparative Example

As illustrated in FIG. 1, an optical fiber characteristics measurement apparatus 90 according to a comparative example includes a light source 911, an optical splitter 920, an adjuster 930, a combiner 940, an optical detector 941, an amplifier 942, a converter 943, and a calculation apparatus 950.

In the optical fiber characteristics measurement apparatus 90, the light source 911 emits frequency-modulated (FM) light. The optical fiber characteristics measurement apparatus 90 further includes a drive power supply 912 and a signal generator 913. The signal generator 913 generates a signal corresponding to the modulation frequency ($f_m$) of the frequency modulation and inputs the signal to the drive power supply 912. The drive power supply 912 drives the light source 911 based on the signal inputted from the signal generator 913. The light source 911 emits frequency-modulated light based on the modulation frequency ($f_m$).

Light emitted from the light source 911 is split into pump light LP and reference light LR at the optical splitter 920. The reference light LR travels through the adjuster 930 to the combiner 940. The adjuster 930 offsets the frequency of the reference light LR by an offset ($f_s$) by single-sideband modulation (SSB) of the reference light LR. The optical fiber characteristics measurement apparatus 90 further includes a signal generator 931. The signal generator 931 generates a signal corresponding to the offset ($f_s$) of the frequency of the reference light LR in the adjuster 930.

The pump light LP travels toward the fiber under test 980 after being split at the optical splitter 920. The optical fiber characteristics measurement apparatus 90 further includes a switch 921, a delay fiber 922, a polarization scrambler (PS) 923, and a circulator 924 between the optical splitter 920 and the fiber under test 980. The switch 921 converts the pump light LP into pulsed light P by chopping. The pulsed light P travels through the delay fiber 922, the polarization scrambler 923, and the circulator 924 to the fiber under test 980. The delay fiber 922 adjusts the phase of the pulsed light P. The polarization scrambler 923 increases the uniformity of the polarization of the pulsed light P. The circulator 924 causes the pulsed light P traveling from the optical splitter 920 to travel toward the fiber under test 980.

Brillouin scattering is generated in the fiber under test 980 by the pulsed light P being incident on the fiber under test 980. Brillouin scattered light LS, generated by Brillouin scattering in the fiber under test 980, returns to the circulator 924. The circulator 924 causes the Brillouin scattered light LS returning from the fiber under test 980 to travel toward the combiner 940, instead of traveling toward the optical splitter 920.

The optical fiber characteristics measurement apparatus 90 generates interference light, which is interference between the reference light LR having the offset frequency and the Brillouin scattered light LS, using the combiner 940 and detects the interference light using the optical detector 941. In other words, the optical fiber characteristics measurement apparatus 90 performs homodyne detection. The optical fiber characteristics measurement apparatus 90 uses the amplifier 942 to amplify the signal yielded by homodyne detection of the interference light and converts the amplified signal into a digital signal using the converter 943.

The optical fiber characteristics measurement apparatus 90 uses the calculation apparatus 950 to process the digital signal yielded by homodyne detection of the interference light and detect a DC component of the signal yielded by homodyne detection of the interference light. Specifically, the calculation apparatus 950 processes the signal yielded by homodyne detection of the interference light with a low-pass filter and detects the DC component of the signal yielded by homodyne detection of the interference light by integrating the DC component and a low-frequency component close to the DC component.

The DC component of the signal yielded by homodyne detection of the interference light is the frequency component corresponding to the offset ($f_s$) of the frequency of the reference light LR in the BGS, which is the frequency spectrum of the Brillouin scattered light LS. The optical fiber characteristics measurement apparatus 90 can acquire the BGS, which is the frequency spectrum of the Brillouin scattered light LS, by acquiring the frequency component corresponding to each offset ($f_s$) while sweeping the offset ($f_s$) of the frequency of the reference light LR using the signal generator 931.

The optical fiber characteristics measurement apparatus 90 calculates the peak frequency of the BGS as the BFS. The BFS is determined based on characteristics, such as temperature or strain, at the position of the correlation peak of the fiber under test 980. Therefore, the optical fiber characteristics measurement apparatus 90 can measure the characteristics of the fiber under test 980 by calculating the BFS.

The specific position at which the correlation peak of the fiber under test 980 appears moves as the modulation frequency ($f_m$) changes. Therefore, the optical fiber characteristics measurement apparatus 90 can measure the distribution of the characteristics of the fiber under test 980 by measuring the characteristics of the fiber under test 980 at the position of each correlation peak while changing the modulation frequency ($f_m$) and causing the position of the correlation peak to move.

Figure 2:
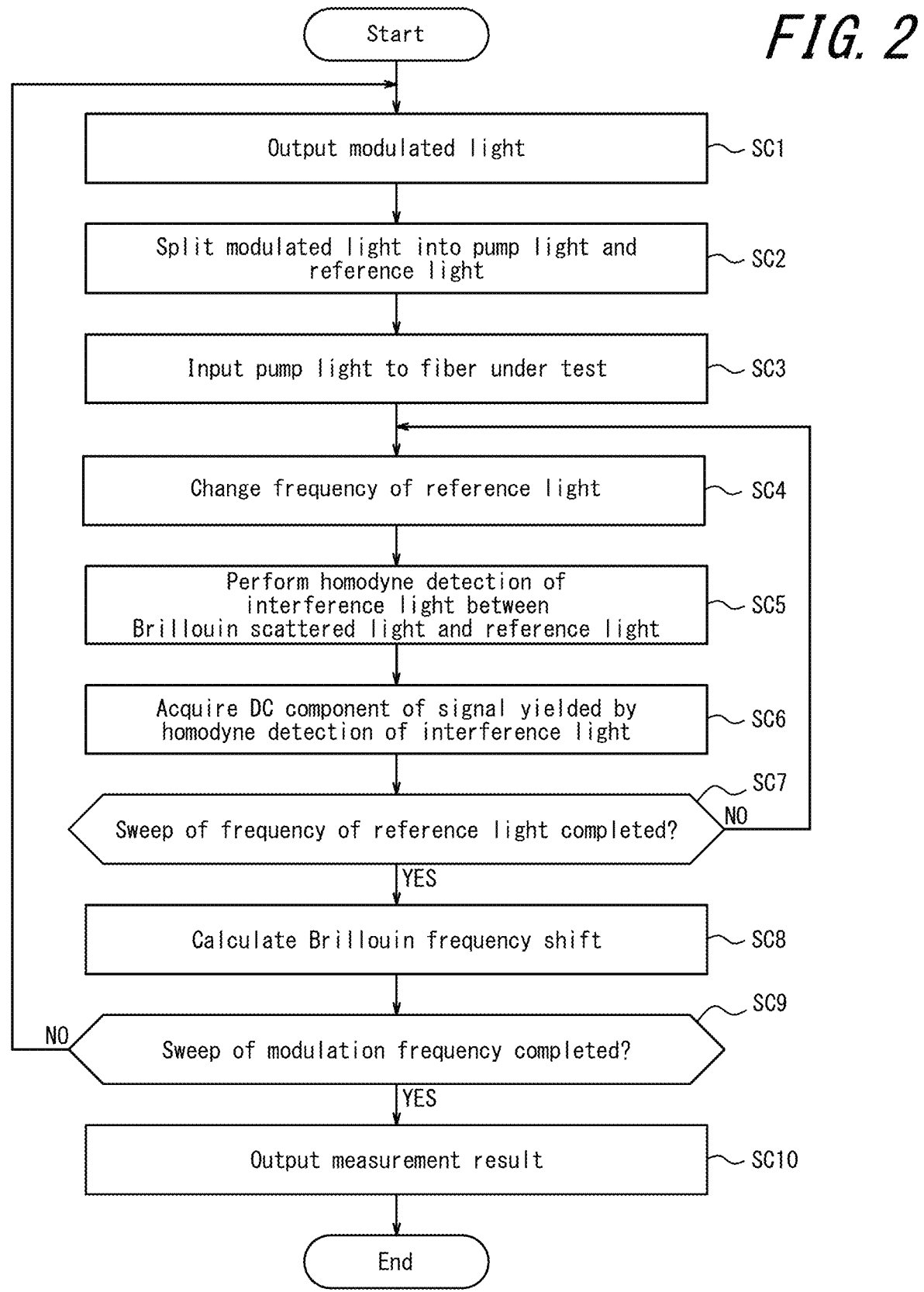
FIG. 2 is a flowchart illustrating a measurement method according to a comparative example.

The optical fiber characteristics measurement apparatus 90 according to the comparative example measures the characteristics of the fiber under test 980 by executing a measurement method including the procedures in the flowchart illustrated in FIG. 2.

The optical fiber characteristics measurement apparatus 90 outputs modulated light, modulated at the modulation frequency, from the light source 911 (step SC1). The optical fiber characteristics measurement apparatus 90 splits the modulated light into a pump light LP and a reference light LR at the optical splitter 920 (step SC2). The optical fiber characteristics measurement apparatus 90 pulses the pump light LP at the switch 921 and inputs the result to the fiber under test 980 (step SC3).

The optical fiber characteristics measurement apparatus 90 changes the frequency of the reference light LR using the adjuster 930 (step SC4). The optical fiber characteristics measurement apparatus 90 performs homodyne detection of the interference light between the Brillouin scattered light LS returned from the fiber under test 980 and the reference light LR using the optical detector 941 (step SC5). The optical fiber characteristics measurement apparatus 90 uses the calculation apparatus 950 to acquire a DC component of the signal yielded by homodyne detection of the interference light (step SC6).

The optical fiber characteristics measurement apparatus 90 determines whether the sweep of the frequency of the reference light LR has been completed (step SC7). It is assumed that the frequency of the reference light LR is swept in the range necessary to calculate the peak frequency of the BGS. In a case in which the sweep of the frequency of the reference light LR has not been completed (step SC7: NO), the optical fiber characteristics measurement apparatus 90 returns to the procedure of changing the frequency of the reference light LR in step SC4.

In a case in which the sweep of the frequency of the reference light LR has been completed (step SC7: YES), the optical fiber characteristics measurement apparatus 90 calculates the peak frequency of the BGS, which is determined based on the components of each frequency, as the BFS (step SC8).

The optical fiber characteristics measurement apparatus 90 determines whether the sweep of the modulation frequency has been completed (step SC9). It is assumed that the modulation frequency is swept in the range necessary to cause the correlation peak to appear at the measurement position of the characteristic distribution of the fiber under test 980. In a case in which the modulation frequency sweep has not been completed (step SC9: NO), the optical fiber characteristics measurement apparatus 90 returns to the procedure to output modulated light in step SC1, changes the modulation frequency, and repeats the procedures from step SC1 to SC8. In a case in which the modulation frequency sweep has been completed (step SC9: YES), the optical fiber characteristics measurement apparatus 90 outputs the measurement results of the characteristic distribution of the fiber under test 980 (step SC10). After completion of the procedure in step SC10, the optical fiber characteristics measurement apparatus 90 terminates the execution of the procedures of the flowchart in FIG. 2. As described above, the optical fiber characteristics measurement apparatus 90 according to the comparative example can measure the characteristic distribution of the fiber under test 980.

Here, the frequency-modulated light used in the BOCDR method contains an amplitude modulation (AM) component. The AM component is contained in the low-frequency component of the interference light. In a case in which the frequency component of the BGS is obtained by using a low-pass filter to process the signal yielded by homodyne detection of the interference light and integrating the low-frequency component, as described above, the AM component becomes noise when acquiring the BGS. Therefore, in order to suppress the AM component and reduce the noise included in the BGS, the optical fiber characteristics measurement apparatus 90 according to the comparative example needs to further include an AM suppressor 990, configured to suppress the AM component, downstream from the light source 911. The AM suppressor 990 may, for example, be configured to make the amplitude constant by saturating the signal with an optical amplifier.

However, provision of the AM suppressor 990 makes the configuration of the optical fiber characteristics measurement apparatus 90 more complex.

Therefore, an optical fiber characteristics measurement apparatus 10 that can reduce the influence of the AM component when acquiring the BGS is described in the present disclosure.

Configuration Example of Optical Fiber Characteristics Measurement Apparatus 10 According to Present Disclosure With reference to FIGS. 3 and 4, an embodiment of an optical fiber characteristics measurement apparatus 10 for measuring the characteristics of an optical fiber is described below. The optical fiber characteristics measurement apparatus 10 according to an embodiment of the present disclosure measures the characteristics of a Fiber Under Test (FUT) 80 using the BOCDR method. The characteristics of the fiber under test 80 include, for example, the temperature distribution or strain distribution in the length direction of the fiber under test 80, vibration of the fiber under test 80, or other characteristics of the fiber under test 80. The characteristics such as frequency, amplitude, or spectrum of the scattered light or reflected light generated in the fiber under test 80 vary depending on physical quantities, such as temperature or strain, that affect the fiber under test 80. Therefore, the fiber under test 80 itself is used as a sensor in the optical fiber characteristics measurement apparatus 10.

Figure 3:
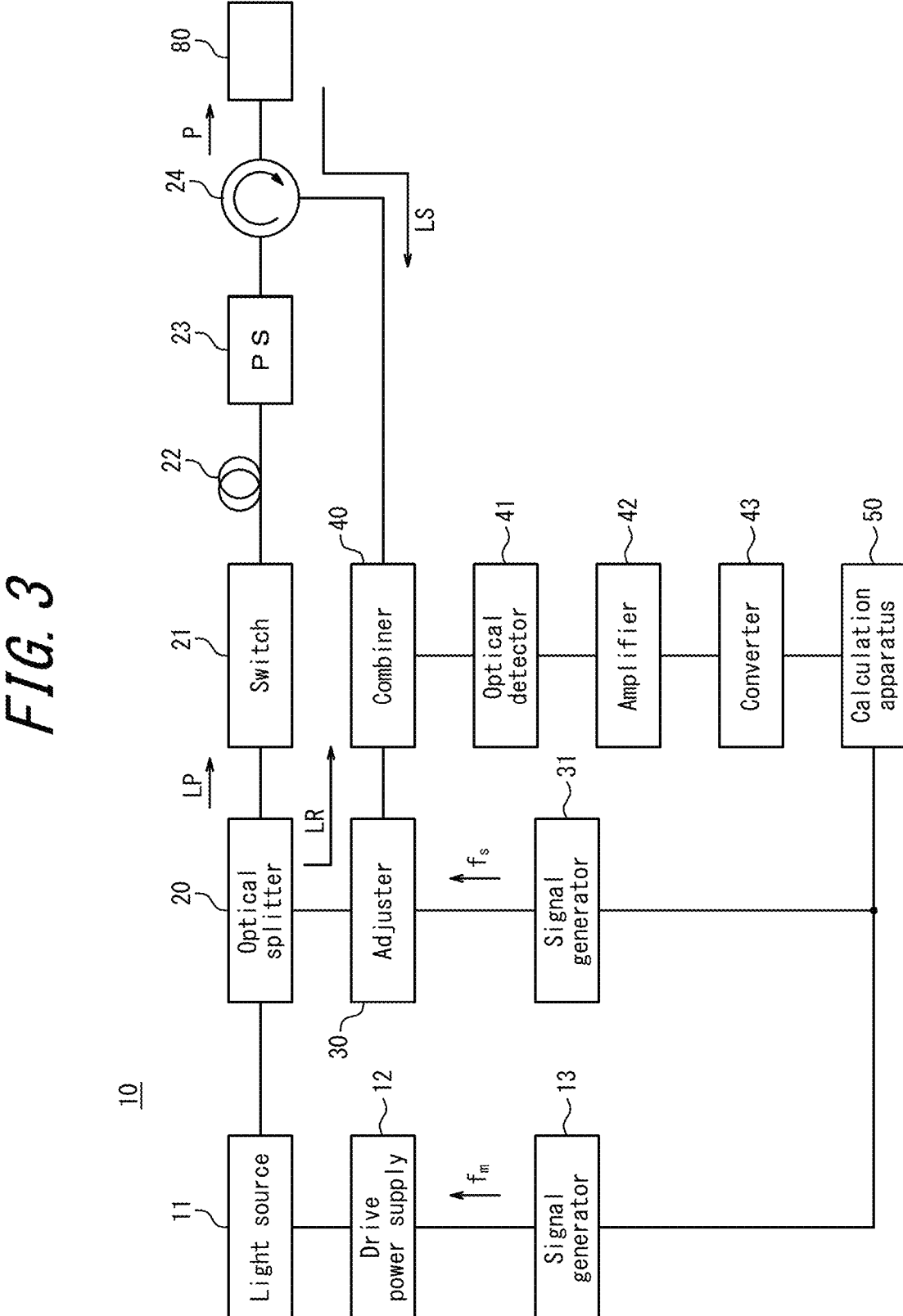
FIG. 3 is a block diagram illustrating a configuration example of an optical fiber characteristics measurement apparatus according to the present disclosure.

As illustrated in FIG. 3, the optical fiber characteristics measurement apparatus 10 according to an embodiment of the present disclosure includes a light source 11, an optical splitter 20, an adjuster 30, a combiner 40, an optical detector 41, an amplifier 42, a converter 43, and a calculation apparatus 50.

The light source 11 emits frequency-modulated light. The light source 11 may, for example, be configured to include a semiconductor laser device, such as a distributed feed-back laser diode (DFB-LD). The optical fiber characteristics measurement apparatus 10 further includes a drive power supply 12 and a signal generator 13. The signal generator 13 generates a modulation signal having a modulation frequency ($f_m$) for frequency modulation and inputs the modulation signal to the drive power supply 12. The drive power supply 12 drives the light source 11 based on the modulation signal inputted from the signal generator 13. The light source 11 emits frequency-modulated light based on the modulation frequency ($f_m$).

The optical splitter 20 splits the inputted light in two or more directions. The optical splitter 20 may, for example, be configured to include an optical coupler.

The optical fiber characteristics measurement apparatus 10 further includes a switch 21, a delay fiber 22, a polarization scrambler (PS) 23, and a circulator 24 between the optical splitter 20 and the fiber under test 80.

The switch 21 converts the pump light LP into pulsed light P by chopping. The pulsed light P travels through the delay fiber 22, the polarization scrambler 23, and the circulator 24 to the fiber under test 80. The delay fiber 22 delays the travel of the pulsed light P by a predetermined time. The delay fiber 22 may, for example, include an optical fiber of a predetermined length. The polarization scrambler 23 controls the state of polarization so that the polarization components in the pulsed light P approach uniformity in each direction of polarization.

The circulator 24 causes the pulsed light P traveling from the optical splitter 20 to travel toward the fiber under test 80. Furthermore, the circulator 24 causes the Brillouin scattered light LS that has returned from the fiber under test 80 to travel toward the combiner 40, instead of traveling toward the optical splitter 20. The Brillouin scattered light LS is light generated by Brillouin scattering in the fiber under test 80. Brillouin scattering is a phenomenon that occurs in the fiber under test 80 by the pulsed light P being incident on the fiber under test 80.

The circulator 24 may be replaced by an optical coupler. The optical splitter 20 is also referred to as the first optical splitter. The circulator 24 is also referred to as the second optical splitter.

The adjuster 30 offsets the frequency of the light by a predetermined amount. The adjuster 30 may be configured to include a single-sideband (SSB) modulator. In FIG. 3, the adjuster 30 offsets the frequency of the reference light LR by a predetermined amount. The adjuster 30 may be installed between the optical splitter 20 and the switch 21, as described below. In this case, the adjuster 30 offsets the frequency of the pump light LP by a predetermined amount. In other words, the adjuster 30 may be a frequency modulator that changes the frequency of at least one of the reference light LR and the pump light LP.

The combiner 40 combines two or more inputted lights into a single light and outputs the combined light. The combiner 40 may, for example, be configured to include an optical coupler.

The optical detector 41 detects the intensity of the inputted light and outputs an electrical signal corresponding to the detected light intensity. The optical detector 41 may, for example, be configured to include a photodiode (PD) or a phototransistor.

The amplifier 42 amplifies the electrical signal. The amplifier 42 may, for example, be configured to include an amplifying device.

The converter 43 converts an analog electrical signal into a digital signal. The converter 43 may, for example, be configured to include an A/D converter.

Figure 4:
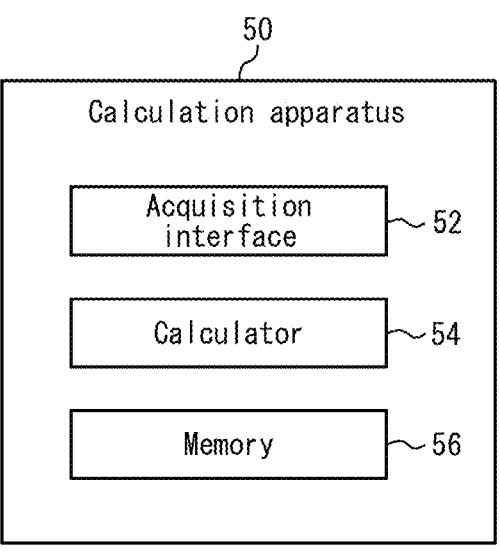
FIG. 4 is a block diagram illustrating an example configuration of a calculation apparatus.

The calculation apparatus 50 includes an acquisition interface 52, a calculator 54, and a memory 56, as illustrated in FIG. 4.

The acquisition interface 52 may include a communication interface that communicates with the converter 43 or the signal generator 13 or 31, for example, by wired or wireless means. The communication interface may be configured to be capable of communication based on a communication standard such as LAN (Local Area Network). The communication standard is not limited to LAN and may be any of various other standards.

The calculator 54 may be configured to include a processor such as a CPU (Central Processing Unit) or a dedicated circuit such as an FPGA (Field Programmable Gate Array). The calculator 54 may be configured to execute a program that implements the functions of the calculation apparatus 50.

The memory 56 may store various information used in the operation of the calculation apparatus 50, programs for implementing the functions of the calculation apparatus 50, and the like. The memory 56 may function as a working memory of the calculator 54. The memory 56 may, for example, be a semiconductor memory. The memory 56 may be configured as an integral part of the calculator 54 or may be configured separately.

The calculation apparatus 50 or the optical fiber characteristics measurement apparatus 10 may include an input device that accepts input from a user. The input device may, for example, include a keyboard or physical keys, a touch panel or touch sensor, or a pointing device such as a mouse.

The calculation apparatus 50 or the optical fiber characteristics measurement apparatus 10 may include a display device. The display device may include various types of displays, such as a liquid crystal display. The calculation apparatus 50 or the optical fiber characteristics measurement apparatus 10 may include an interface to output, to an external display apparatus, information to be displayed. The calculation apparatus 50 or the optical fiber characteristics measurement apparatus 10 may include an audio output device, such as a speaker. The calculation apparatus 50 or the optical fiber characteristics measurement apparatus 10 may include an interface to output audio information to an external speaker or the like.

Operation Example of Optical Fiber Characteristics Measurement Apparatus 10 According to Present Disclosure In the optical fiber characteristics measurement apparatus 10, the light source 11 emits frequency-modulated (FM)

light based on the modulation frequency ($f_m$) under the control of the drive power supply 12 and the signal generator 13.

Light emitted from the light source 11 is split into pump light LP and reference light LR at the optical splitter 20. The reference light LR travels through the adjuster 30 to the combiner 40. The adjuster 30 offsets the frequency of the reference light LR by an offset ($f_s$) by single-sideband modulation (SSB) of the reference light LR. The optical fiber characteristics measurement apparatus 10 further includes a signal generator 31. The signal generator 31 generates a signal corresponding to the offset ($f_s$) of the frequency of the reference light LR in the adjuster 30 and inputs the signal to the adjuster 30.

After being split by the optical splitter 20, the pump light LP travels through the switch 21, the delay fiber 22, and the polarization scrambler 23 toward the circulator 24. The delay fiber 22 can adjust the delay time of the pulsed light P by a change in the length of the optical fiber. The delay fiber 22 is used to place the zero-order correlation peak, which does not move even in the case of sweeping the modulation frequency ($f_m$), outside the fiber under test 80.

The circulator 24 causes the pulsed light P traveling from the optical splitter 20 to travel toward the fiber under test 80. Furthermore, the circulator 24 causes the Brillouin scattered light LS that has returned from the fiber under test 80 to travel toward the combiner 40, instead of traveling toward the optical splitter 20. The Brillouin scattered light LS is light generated by Brillouin scattering in the fiber under test 80. Brillouin scattering is a phenomenon that occurs in the fiber under test 80 by the pulsed light P being incident on the fiber under test 80.

The operation of the optical splitter 20, also referred to as the first optical splitter, and the circulator 24, also referred to as the second optical splitter, can be paraphrased as follows. The first optical splitter splits the modulated light subjected to frequency modulation into a pump light LP and a reference light LR, causes the pump light LP to travel to the second optical splitter, and causes the reference light LR to travel to the combiner 40. The second optical splitter causes the pump light LP to travel toward the fiber under test 80 so as to be incident on the fiber under test 80 from one end. The second optical splitter also causes the Brillouin scattered light LS, which is generated in the fiber under test 80 and returns, to travel to the combiner 40. In other words, the second optical splitter causes the pump light to be incident on the fiber under test 80 from one end and extracts the Brillouin scattered light LS generated within the fiber under test 80.

The optical fiber characteristics measurement apparatus 10 generates interference light, which is interference between the reference light LR having the offset frequency and the Brillouin scattered light LS, using the combiner 40 and detects the interference light using the optical detector 41. In other words, the optical fiber characteristics measurement apparatus 10 performs homodyne detection. The optical fiber characteristics measurement apparatus 10 uses the amplifier 42 to amplify the signal yielded by homodyne detection of the interference light and converts the amplified signal into a digital signal using the converter 43. The converter 43 outputs, to the calculation apparatus 50, a digital signal yielded by sampling, at a predetermined sampling frequency, the signal yielded by homodyne detection of the interference light.

Figure 5:
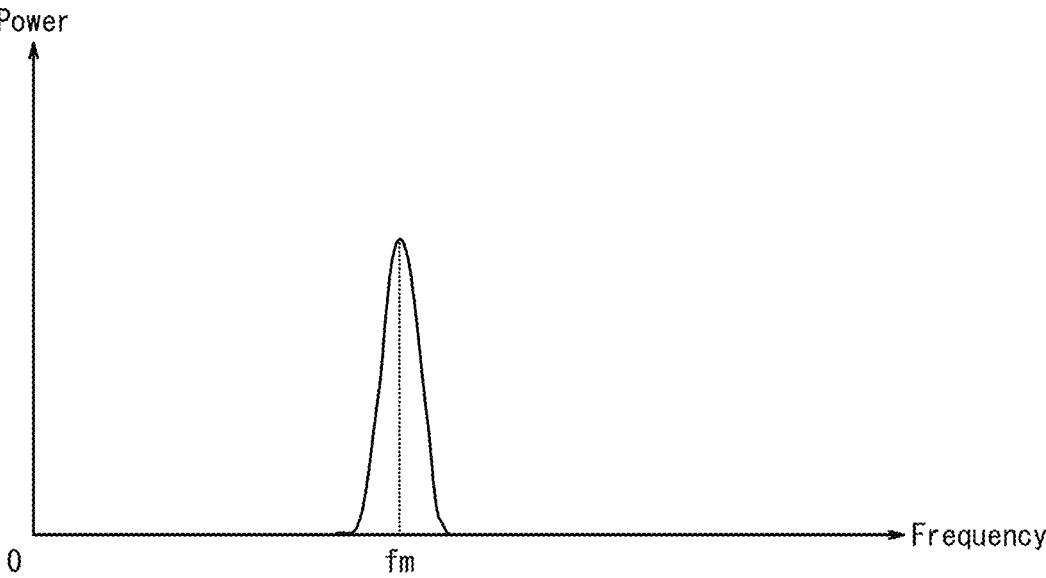
FIG. 5 is a graph illustrating an example of the frequency spectrum of modulated light.
Figure 6:
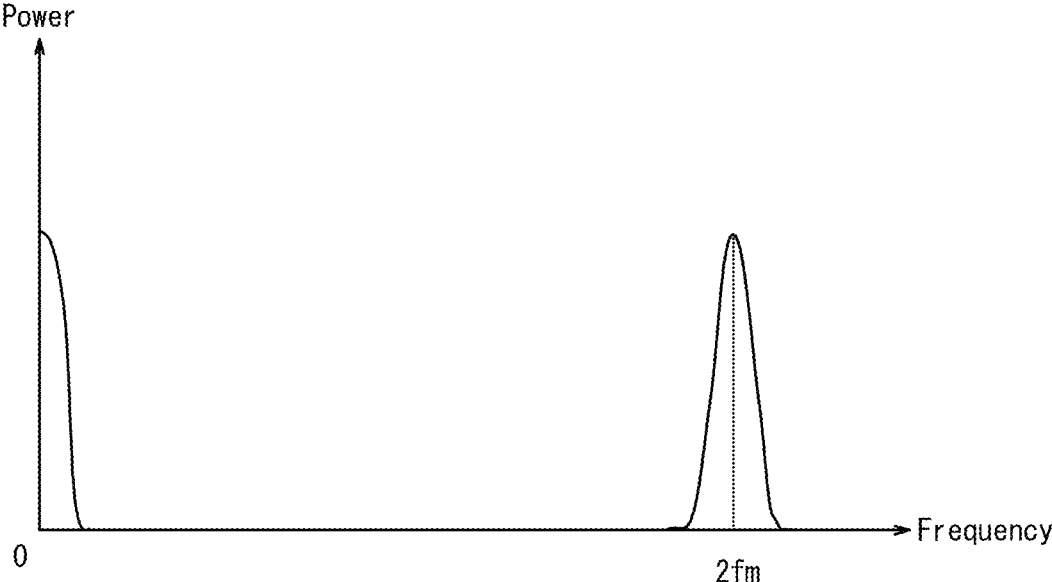
FIG. 6 is a graph illustrating an example of the frequency spectrum of a signal yielded by homodyne detection of interference light.

Here, the spectrum of the modulated light has a component with a peak at the modulation frequency ($f_m$), as illustrated in FIG. 5. The spectrum of the reference light LR split off from the modulated light also has a component with a peak at the modulation frequency ($f_m$). In addition, the spectrum of the Brillouin scattered light LS generated by the pump light LP split off from the modulated light has a component with a peak at the modulation frequency ($f_m$). On the other hand, the power at the peak frequency of the spectrum of the Brillouin scattered light LS is different from the power at the peak frequency of the spectrum of the reference light LR. As a result, the spectrum of interference light, which is the interference between the reference light LR and the Brillouin scattered light LS, includes a DC component, which is the difference frequency component between the reference light LR and the Brillouin scattered light LS, and a second harmonic component, which is the sum frequency component between the reference light LR and the Brillouin scattered light LS, as illustrated in FIG. 6. The second harmonic component is a component with a frequency ($2f_m$) that is two times the modulation frequency ($f_m$). The horizontal axis in FIG. 5 and FIG. 6 represents frequency. The vertical axis represents the power of each frequency component.

The power of the DC component of the signal yielded by homodyne detection of the interference light and the power of the second harmonic component both represent the power of the frequency component corresponding to the offset ($f_s$) of the frequency of the reference light LR in the BGS, which is the frequency spectrum of the Brillouin scattered light LS. Therefore, the frequency components of the BGS can also be acquired by detecting the power of the second harmonic component of the signal yielded by homodyne detection of the interference light.

The optical fiber characteristics measurement apparatus 10 according to the present disclosure uses the calculation apparatus 50 to process the digital signal yielded by homodyne detection of the interference light and detect the second harmonic component of the signal yielded by homodyne detection of the interference light.

Specifically, the calculation apparatus 50 acquires a digital signal using the acquisition interface 52. The calculation apparatus 50 also uses the acquisition interface 52 to acquire a signal corresponding to the modulation frequency ($f_m$) of the frequency modulation, or to acquire the value of the modulation frequency ($f_m$), from the signal generator 13 and to acquire a signal corresponding to the offset ($f_s$) of the frequency of the reference light LR, or to acquire the value of the offset ($f_s$), from the signal generator 31.

The calculation apparatus 50 uses the calculator 54 to process the digital signal and detect a component with a frequency ($2f_m$) that is two times the modulation frequency as the second harmonic component of the signal yielded by homodyne detection of the interference light. The calculator 54 detects the second harmonic component by mixing the digital signal yielded by homodyne detection of the interference light and the detection signal that has the frequency that is two times the modulation frequency of the modulated light. The detection signal may, for example, be a sine wave having a frequency that is two times the modulation frequency of the modulated light. The detection signal may be inputted to the calculation apparatus 50 from the signal generator 13. In other words, the signal generator 13 may be configured to input a signal corresponding to the modulation frequency to the drive power supply 12 and also to input the detection signal to the calculation apparatus 50. The signal yielded by homodyne detection of the interference light may be mixed with the detection signal by a lock-in operation. In other words, the calculator 54 may perform a lock-in operation on the signal yielded by homodyne detection of the interference light and a sine wave having a frequency that is two times the modulation frequency of the modulated light, so as to calculate the power of the component with a frequency of $2f_m$ among the frequency components of the signal yielded by homodyne detection of the interference light, and may detect the result as the second harmonic component. In order to be able to perform a lock-in operation on the signal yielded by homodyne detection of the interference light and a sine wave having a frequency that is two times the modulation frequency, the conversion to a digital signal in the converter 43 upstream from the calculation apparatus 50 may be performed at a frequency that is at least two times the frequency that is two times the modulation frequency ($2f_m$), i.e., at a sampling frequency of $4f_m$ or greater. In this case, the predetermined sampling frequency may be at least two times the frequency that is two times the modulation frequency of the modulated light. The optical detector 41 that subjects the interference light to homodyne detection is configured to have a response speed sufficiently fast relative to the frequency that is two times the modulation frequency ($2f_m$).

The calculation apparatus 50 stores, in the memory 56, the signal or information acquired by the acquisition interface 52 or the results of processing the digital signal using the calculator 54.

On the other hand, in the comparative example, the DC component of the signal yielded by homodyne detection of the interference light was detected. In other words, the optical fiber characteristics measurement apparatus 10 according to the present disclosure differs from the comparative example by detecting the second harmonic component instead of the DC component of the signal yielded by homodyne detection of the interference light.

In the case of detecting the DC component, a low-pass filter is used. The cutoff frequency of the low-pass filter needs to be sufficiently shortened to remove high-frequency components. On the other hand, it is difficult to make the cutoff frequency of the low-pass filter sufficiently short in measurements that require a fast time response, as in a temporal gate method. If the cutoff frequency of the low-pass filter is not sufficiently shortened, the detection result of the DC component of the signal yielded by homodyne detection contains an AM component.

On the other hand, a bandpass filter or a high-pass filter is used in the case of detecting the second harmonic component of the signal yielded by homodyne detection of the interference light. The bandpass filter or high-pass filter allows the frequency components in a range including the second harmonic component to be transmitted with little attenuation while sufficiently attenuating the low-frequency components. Therefore, the detection result of the second harmonic component of the signal yielded by homodyne detection of the interference light contains almost no AM component.

It follows that by detecting the second harmonic component of the signal yielded by homodyne detection of the interference light, the optical fiber characteristics measurement apparatus 10 according to the present disclosure can reduce the influence of the AM component included in the BGS as compared to the case of detecting the DC component. In addition to the above-described method of mixing the detection signals, other examples of methods of detecting the second harmonic component of the signal yielded by homodyne detection of the interference light include acquiring the second harmonic component by calculation using a Fourier transform, or using a hardware lock-in amplifier.

Furthermore, the detection of the second harmonic component of the signal yielded by homodyne detection of the interference light eliminates the need for the normalization processing necessary in the case of detecting the DC component. Normalization is a process to remove noise or bias originally superimposed on the signal yielded by homodyne detection of the interference light, which is the detection target, to improve the accuracy of BGS measurement when measuring the BGS by detecting the DC component of the signal yielded by homodyne detection of the interference light. The normalized waveform containing noise or bias changes over a long period of time. In order to remove the effects of changes in the normalized waveform, which changes over a long period of time, the normalization processing needs to be performed periodically. As a result of detection of the second harmonic component of the signal yielded by homodyne detection of the interference light, however, the detection signal no longer contains noise or bias. The absence of noise or bias eliminates the need for normalization processing to remove noise or bias. The BGS measurement results are also less susceptible to normalized waveforms that vary over a long period of time. As a result, the stability of the BGS measurement over a long period of time is enhanced.

The optical fiber characteristics measurement apparatus 10 according to the present disclosure changes the frequency of the reference light LR to a plurality of frequencies by sweeping the offset of the frequency of the reference light LR using the adjuster 30, and while doing so performs homodyne detection on interference light between the Brillouin scattered light LS and the reference light LR changed to each frequency. The optical fiber characteristics measurement apparatus 10 acquires the power of the frequency component corresponding to the swept offsets in the BGS by using the calculation apparatus 50 to detect the second harmonic component, which is the frequency component that is two times the modulation frequency of the modulated light among the frequency components of the signal yielded by homodyne detection of the interference light. The optical fiber characteristics measurement apparatus 10 can acquire the BGS by using the calculation apparatus 50 to combine the power of each frequency component of the BGS acquired by sweeping the offset of the frequency of the reference light LR.

The frequency of the Brillouin scattered light LS corresponding to the swept offset $(f_s)$ is also referred to as the frequency at which the Brillouin scattered light LS is measured. In a case in which the swept offset $(f_s)$ corresponds to a frequency band, the frequency of the Brillouin scattered light LS corresponding to the swept offset $(f_s)$ is also referred to as the frequency band at which the Brillouin scattered light LS is measured.

The optical fiber characteristics measurement apparatus 10 calculates the peak frequency of the BGS as the BFS. The BFS is determined based on characteristics, such as temperature or strain, at the position of the correlation peak of the fiber under test 80. Therefore, the optical fiber characteristics measurement apparatus 10 can measure the characteristics of the fiber under test 80 by calculating the BFS. In other words, the optical fiber characteristics measurement apparatus 10 can use the calculation apparatus 50 to measure the characteristics of the fiber under test 80 based on the second harmonic component, which is a component having a frequency that is two times the modulation frequency of the modulated light, among the frequency components of the signal yielded by homodyne detection of the interference light.

The specific position at which the correlation peak of the fiber under test 80 appears moves as the modulation frequency $(f_m)$ changes. Therefore, the optical fiber characteristics measurement apparatus 10 can measure the distribution of the characteristics of the fiber under test 80 by measuring the characteristics of the fiber under test 80 at the position of each correlation peak while changing the modulation frequency $(f_m)$ and causing the position of the correlation peak to move.

Example Flowchart for Method of Measuring
Optical Fiber Characteristics

Figure 7:
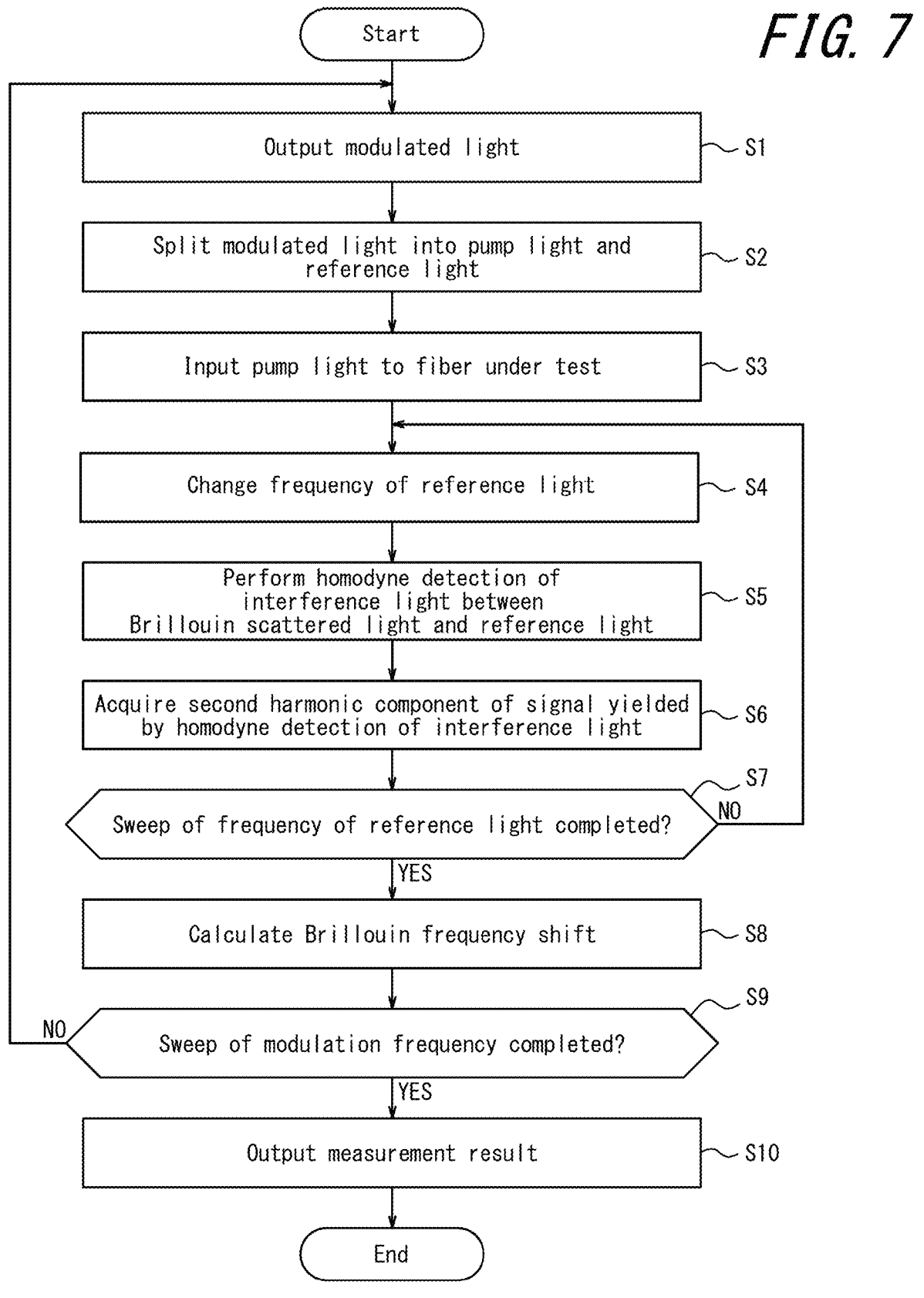
FIG. 7 is a flowchart illustrating example procedures of a method of measuring optical fiber characteristics according to the present disclosure.

The optical fiber characteristics measurement apparatus 10 according to the present disclosure may measure the characteristics of the fiber under test 80 by executing a method of measuring optical fiber characteristics that includes the procedures in the flowchart illustrated in FIG. 7. At least a portion of the method of measuring optical fiber characteristics may be realized as a program for measuring optical fiber characteristics to be executed by the calculator 54 of the calculation apparatus 50 or the like. The program for measuring optical fiber characteristics may be stored on a non-transitory computer readable medium.

The optical fiber characteristics measurement apparatus 10 outputs modulated light, modulated at the modulation frequency, from the light source 11 (step S1). The optical fiber characteristics measurement apparatus 10 splits the modulated light into a pump light LP and a reference light LR at the optical splitter 20 (step S2). The optical fiber characteristics measurement apparatus 10 pulses the pump light LP at the switch 21 and inputs the result to the fiber under test 80 (step S3).

The optical fiber characteristics measurement apparatus 10 changes the frequency of the reference light LR using the adjuster 30 (step S4). The optical fiber characteristics measurement apparatus 10 uses the circulator 24 to extract the Brillouin scattered light LS generated in the fiber under test 80 and uses the optical detector 41 to detect the interference light resulting from interference between the Brillouin scattered light LS and the reference light LR, thereby performing homodyne detection of the interference light between the Brillouin scattered light LS and the reference light LR (step S5). The optical fiber characteristics measurement apparatus 10 uses the calculation apparatus 50 to acquire a second harmonic component of the signal yielded by homodyne detection of the interference light (step S6).

The optical fiber characteristics measurement apparatus 10 determines whether the sweep of the frequency of the reference light LR has been completed (step S7). It is assumed that the frequency of the reference light LR is swept in the range necessary to calculate the peak frequency of the BGS. In other words, the optical fiber characteristics measurement apparatus 10 changes the frequency of the reference light LR to a plurality of frequencies using the adjuster 30. In a case in which the sweep of the frequency of the reference light LR has not been completed (step S7: NO), the optical fiber characteristics measurement apparatus 10 returns to the procedure of changing the frequency of the reference light LR in step S4.

In a case in which the sweep of the frequency of the reference light LR has been completed (step S7: YES), the optical fiber characteristics measurement apparatus 10 calculates the peak frequency of the BGS, which is determined based on the components of each frequency, as the BFS (step S8).

The optical fiber characteristics measurement apparatus 10 determines whether the sweep of the modulation frequency has been completed (step S9). It is assumed that the modulation frequency is swept in the range necessary to cause the correlation peak to appear at the measurement position of the characteristic distribution of the fiber under test 80. In a case in which the modulation frequency sweep has not been completed (step S9: NO), the optical fiber characteristics measurement apparatus 10 returns to the procedure to output modulated light in step S1, changes the modulation frequency, and repeats the procedures from step S1 to S8. In a case in which the modulation frequency sweep has been completed (step S9: YES), the optical fiber characteristics measurement apparatus 10 outputs the measurement results of the characteristic distribution of the fiber under test 80 (step S10). In other words, the optical fiber characteristics measurement apparatus 10 uses the calculation apparatus 50 to measure the characteristics of the fiber under test 80 based on the second harmonic component, which is a component having a frequency that is two times the modulation frequency of the modulated light, among the frequency components of the signal yielded by homodyne detection of the interference light. After completion of the procedure in step S10, the optical fiber characteristics measurement apparatus 10 terminates the execution of the procedures of the flowchart in FIG. 7. As described above, the optical fiber characteristics measurement apparatus 10 according to the present disclosure can measure the characteristic distribution of the fiber under test 80.

Summary

As described above, the optical fiber characteristics measurement apparatus 10 according to the present disclosure can reduce the influence of the AM component on the BGS by detecting the second harmonic component of the signal yielded by homodyne detection of the interference light to acquire the BGS. The ability to reduce the effect of the AM component on the BGS makes the AM suppressor 990 used in the optical fiber characteristics measurement apparatus 90 according to the comparative example unnecessary. As a result, the optical fiber characteristics measurement apparatus 10 according to the present disclosure has a simple configuration.

The optical fiber characteristics measurement apparatus 10 according to the present disclosure is also less susceptible to the effect of AM components caused by temperature drift and can operate stably. In addition, by being able to reduce the effect of the AM component on the BGS, the optical fiber characteristics measurement apparatus 10 according to the present disclosure can improve the measurement accuracy of the characteristics of the fiber under test 80 based on the BFS calculated from the BGS.

The optical fiber characteristics measurement apparatus 10 according to the present disclosure can acquire the BGS by homodyne detection of the interference light. In the case of heterodyne detection of interference light, frequency analysis using an ESA (Electric Spectrum Analyzer) needs to be performed. Performing homodyne detection of interference light makes it unnecessary to perform frequency analysis using an ESA. By eliminating the need for an ESA, the optical fiber characteristics measurement apparatus 10 according to the present disclosure has a simple configuration. For example, a reduction in size and power consumption of the optical fiber characteristics measurement apparatus 10 are achieved. The optical fiber characteristics measurement apparatus 10 according to the present disclosure may also perform software processing by sampling the signal yielded by homodyne detection of the interference light to acquire the BGS. The circuit is thus simplified.

The optical fiber characteristics measurement apparatus 10 according to the present disclosure detects the second harmonic component by mixing the signal yielded by homodyne detection of the interference light and the detection signal that has the frequency that is two times the modulation frequency of the modulated light. Furthermore, by the optical fiber characteristics measurement apparatus 10 according to the present disclosure inputting the modulation signal to the light source 11 and the detection signal to the calculation apparatus 50 from the signal generator 31, the frequency difference and relative phase difference between the modulation wave and the detection signal are kept constant. As a result, long-term measurement stability is enhanced.

Other Embodiment

A measurement method according to another embodiment is described below.

Figure 8:
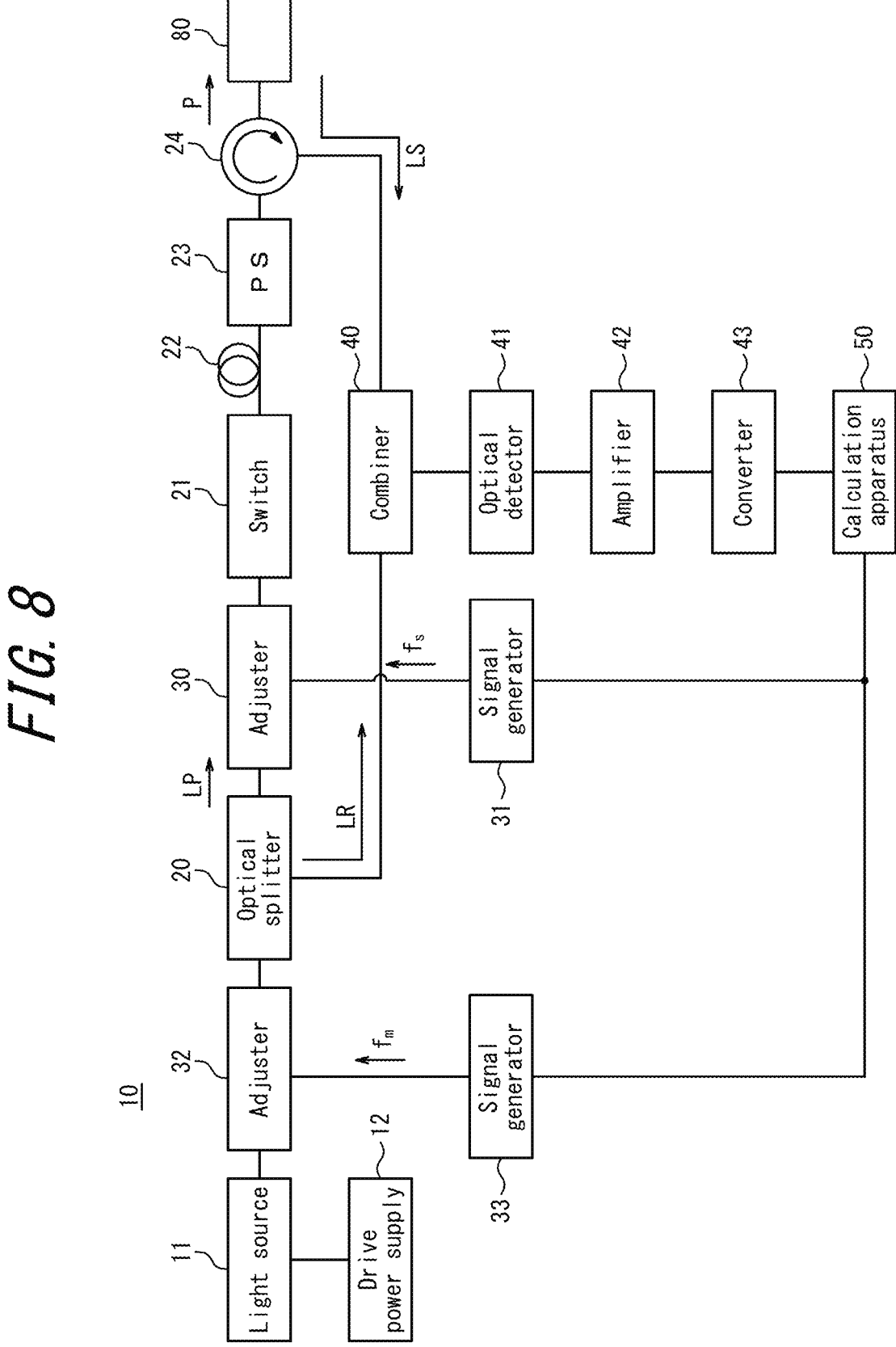
FIG. 8 is a block diagram illustrating a configuration example of an optical fiber characteristics measurement apparatus according to another embodiment.

An optical fiber characteristics measurement apparatus 10 according to another embodiment may include an adjuster 32 that performs frequency modulation between the light source 11 and the optical splitter 20, as illustrated in FIG. 8. The optical fiber characteristics measurement apparatus 10 may include a signal generator 33 that inputs a modulation signal having a modulation wave frequency $(f_m)$ to the adjuster 32. The adjuster 30 may be installed between the optical splitter 20 and the switch 21. In this case, the adjuster 30 offsets the frequency of the pump light LP by an offset $(f_s)$. As illustrated in FIGS. 3 and 8, the adjuster 30 may be a frequency modulator that changes the frequency of at least one of the reference light LR and the pump light LP. The fact that the adjuster 30 is a frequency modulator enables homodyne detection of the interference light and consequently eliminates the need for expensive RF (Radio Frequency) band components. An ESA is also no longer necessary. The lack of need for an ESA achieves a reduction in size and power consumption of the optical fiber characteristics measurement apparatus 10.

The optical fiber characteristics measurement apparatus 10 need not include the switch 21 for pulsing the pump light LP. The optical fiber characteristics measurement apparatus 10 may generate the pulsed light P incident on the fiber under test 80 by a double modulation method without using the switch 21. In this case as well, the optical fiber characteristics measurement apparatus 10 can still acquire the BGS by homodyne detection of the interference light between the reference light LR and the Brillouin scattered light LS to detect the second harmonic component.

Embodiments of the present disclosure have been described with reference to the drawings, but specific configurations are not limited to these embodiments, and a variety of modifications may be made without departing from the spirit and scope thereof.

The invention claimed is:

1. An optical fiber characteristics measurement apparatus comprising:

a first optical splitter configured to split a modulated light subjected to frequency modulation into a pump light and a reference light;

a second optical splitter configured to cause the pump light to be incident on a fiber under test from one end and configured to extract Brillouin scattered light generated within the fiber under test;

a modulator configured to change a frequency of at least one of the reference light and the pump light to a plurality of frequencies; and a circuit configured to detect a second harmonic component among frequency components of a signal yielded by homodyne detection of interference light between the Brillouin scattered light and the reference light at each frequency, and measure characteristics of the fiber under test based on the detected second harmonic component, the second harmonic component being a component having a frequency that is two times a modulation frequency of the modulated light.

2. The optical fiber characteristics measurement apparatus according to claim 1, further comprising an A/D converter configured to output, to the circuit, a signal yielded by sampling, at a predetermined sampling frequency, the signal yielded by homodyne detection of the interference light, wherein the predetermined sampling frequency is at least two times the frequency that is two times the modulation frequency of the modulated light.

3. The optical fiber characteristics measurement apparatus according to claim 2, wherein the circuit is configured to calculate the second harmonic component by mixing the signal yielded by homodyne detection of the interference light and a detection signal having a frequency that is two times the modulation frequency of the modulated light.

4. The optical fiber characteristics measurement apparatus according to claim 3, further comprising a light source configured to emit the modulated light and cause the modulated light to travel to the first optical splitter; and an oscillator configured to output a modulation signal having the modulation frequency of the modulated light to the light source and input the detection signal to the circuit.

5. The optical fiber characteristics measurement apparatus according to claim 1, wherein the circuit is configured to calculate the second harmonic component by mixing the signal yielded by homodyne detection of the interference light and a detection signal having a frequency that is two times the modulation frequency of the modulated light.

6. The optical fiber characteristics measurement apparatus according to claim 3, further comprising a light source configured to emit the modulated light and cause the modulated light to travel to the first optical splitter; and an oscillator configured to output a modulation signal having the modulation frequency of the modulated light to the light source and input the detection signal to the circuit.

7. The optical fiber characteristics measurement apparatus according to claim 1, wherein the modulator is configured to sweep the frequency of at least one of the reference light and the pump light to a plurality of frequencies; and the circuit is configured to acquire a Brillouin gain spectrum determined based on characteristics of the fiber under test by combining the second harmonic component among frequency components of the signal yielded by homodyne detection of interference light between the Brillouin scattered light and the reference light at each swept frequencies, wherein the circuit is configured to calculate a peak frequency of the Brillouin gain spectrum as a Brillouin frequency shift determined based on the characteristics of the fiber under test.

8. A method of measuring optical fiber characteristics, the method comprising:

splitting a modulated light subjected to frequency modulation into a pump light and a reference light;

causing the pump light to be incident on a fiber under test from one end;

extracting Brillouin scattered light generated within the fiber under test;

changing a frequency of at least one of the reference light and the pump light to a plurality of frequencies; and detecting a second harmonic component among frequency components of a signal yielded by homodyne detection of interference light between the Brillouin scattered light and the reference light at each frequency, and measuring characteristics of the fiber under test based on the detected second harmonic component, the second harmonic component being a component having a frequency that is two times a modulation frequency of the modulated light.

* * * * *